United States Patent
Lim et al.

(10) Patent No.: US 11,336,622 B2
(45) Date of Patent: May 17, 2022

(54) APPARATUS AND METHOD FOR DEPLOYING FIREWALL ON SDN AND NETWORK USING THE SAME

(71) Applicant: GWANGJU INSTITUTE OF SCIENCE AND TECHNOLOGY, Gwangju (KR)

(72) Inventors: Hyuk Lim, Gwangju (KR); Sung Hwan Kim, Gwangju (KR); Jargalsaikhan Narantuya, Gwangju (KR); Seung Hyun Yoon, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 314 days.

(21) Appl. No.: 16/689,003

(22) Filed: Nov. 19, 2019

(65) Prior Publication Data
US 2020/0162430 A1 May 21, 2020

(30) Foreign Application Priority Data
Nov. 20, 2018 (KR) .................. 10-2018-0143393

(51) Int. Cl.
*H04L 9/40* (2022.01)
*H04L 43/08* (2022.01)
(Continued)

(52) U.S. Cl.
CPC ........ *H04L 63/0263* (2013.01); *H04L 9/0825* (2013.01); *H04L 43/08* (2013.01);
(Continued)

(58) Field of Classification Search
CPC ... H04L 63/0263; H04L 9/0825; H04L 43/08; H04L 45/38; H04L 49/25; H04L 63/0442; H04L 12/26; H04L 9/08; H04L 29/06
See application file for complete search history.

(56) References Cited

U.S. PATENT DOCUMENTS

| 10,341,298 B1 * | 7/2019 | Lichtenberg | ........ H04L 63/0263 |
| 2003/0188192 A1 * | 10/2003 | Tang | ..................... H04L 63/164 726/13 |

(Continued)

FOREIGN PATENT DOCUMENTS

KR 20170024032 A 3/2017

OTHER PUBLICATIONS

Jeong et al. "Applicability of Interfaces to Network Security Functions to Networked Security Services." IETF 99, Prague, Czech (Jul. 18, 2017).

(Continued)

*Primary Examiner* — Techane Gergiso
(74) *Attorney, Agent, or Firm* — Loza & Loza, LLP; Heidi Eisenhut (57) ABSTRACT

An apparatus for deploying a firewall on a software-defined network (SDN) includes a public key distributor configured to transmit a public key, a resource monitor configured to monitor resources of a network, a host monitor configured to receive a firewall rule of at least one host, which is encrypted by the public key, a decryption unit configured to decrypt information received from the host monitor by using a secret key, a merge unit configured to merge the decrypted information to provide a merged firewall rule, and a firewall deployment unit configured to deploy the merged firewall rule to a switch.

10 Claims, 7 Drawing Sheets

(51) Int. Cl.
    *H04L 49/25*     (2022.01)
    *H04L 45/00*     (2022.01)
    *H04L 9/08*     (2006.01)
    *H04L 29/06*     (2006.01)

(52) U.S. Cl.
    CPC .............. *H04L 45/38* (2013.01); *H04L 49/25* (2013.01); *H04L 63/0442* (2013.01)

(56) References Cited

U.S. PATENT DOCUMENTS

| | | |
|---|---|---|
| 2015/0222598 A1 | 8/2015 | Koponen et al. |
| 2015/0326532 A1 | 11/2015 | Grant et al. |
| 2017/0142010 A1 | 5/2017 | Mathew et al. |
| 2017/0237686 A1 | 8/2017 | Wang |
| 2018/0062923 A1* | 3/2018 | Katrekar ............... H04L 63/062 |

OTHER PUBLICATIONS

Lorenz et al. "An sdn/nfv-enabled enterprise network architecture offering fine-grained security policy enforcement." IEEE Commun. Mag., vol. 55, No. 3, pp. 217-223, Aug. 29, 2016. (14 pages).

* cited by examiner

APPARATUS AND METHOD FOR DEPLOYING FIREWALL ON SDN AND NETWORK USING THE SAME

CROSS-REFERENCE TO RELATED APPLICATIONS

The present application claims the benefits of priority to Korean Patent Application No. 10-2018-0143393 filed on Nov. 20, 2018, which is herein incorporated by reference in its entirety.

BACKGROUND

The present disclosure relates to an apparatus and a method for deploying a firewall on a software-defined network (SDN) and a network to which the apparatus or the method is applied.

In general, a firewall is a device that performs packet filtering in a fixed location of a network or inside a host so as to prevent the host from being attacked. Packet filtering is performed by permitting or discarding packets according to a firewall rule that is unique to each firewall.

Meanwhile, SDN environment is established in which network control functions and physical networks are separated according to environments of enlargement/complexity of networks, introduction of cloud environments, limitation of lifetime of network devices, and characterization of dynamic network traffics. Similar to the firewall, the SDN has a flow table that defines a flow rule of each switch. Similar to the firewall rule, the flow rule has information such as protocol, IP address, MAC address, and the like.

Even in the SDN environment, the firewall function must be provided to the host.

For this purpose, as the related art, there is an SDN-based firewall technology. According to the SDN-based firewall technology, an SDN controller inspects a packet in the center and places a flow rule corresponding to the packet in a switch to perform a firewall function.

As another technology, there is an SDN/Network Function Virtualization (NFV)-based firewall technology. The SDN/NFV-based firewall technology makes the existing firewall function as Virtual Network Function (VNF), and uses the SDN technology to allow traffic to pass through the virtual firewall. As the products to which the present technology is applied, there are FlowGuard and AuthFlow.

A firewall technology implemented by combining the SDN-based firewall technology and the SDN/NFV-based firewall technology has also been introduced. As an example, Reference 1 may be referred to. The technology of Reference 1 has been applied to NSX data center of Nicira Networks Inc.

The related art of the firewall for the SDN has an inefficient problem, such as necessity to provide a separate management server, or necessity to provide a firewall to each virtual machine.

PRIOR ART DOCUMENT

Non-Patent Document (Non-Patent Document 1) C. Lorenz, D. Hock, J. Scherer, R. Durner, W. Kellerer, S. Gebert, N. Gray, T. Zinner, and P. Tran-Gia, "An sdn/nfv-enabled enterprise network architecture offering fine-grained security policy enforcement." IEEE Commun. Mag., vol. 55, no. 3, pp. 217-223, 2017.

SUMMARY

The present disclosure is proposed under the above background and is directed to propose an apparatus and a method for deploying a firewall on an SDN, which are capable of minimizing network resource waste, and a network to which the apparatus or the method is applied.

In one embodiment, an apparatus for deploying a firewall on a software-defined network (SDN) includes: a public key distributor configured to transmit a public key; a resource monitor configured to monitor resources of a network; a host monitor configured to receive a firewall rule of at least one host, which is encrypted by the public key; a decryption unit configured to decrypt information received from the host monitor by using a secret key; a merge unit configured to merge the decrypted information to provide a merged firewall rule; and a firewall deployment unit configured to deploy the merged firewall rule to a switch.

According to the present disclosure, the data capacity of the network can be reduced by transmitting the newly merged firewall of an appropriate capacity to the switch in response to the firewall rule of the host included in the SDN. In this case, the switch is not the entire switch of the SDN, but some selected switches that perform the optimal effect. The switch may provide the network monitoring performance and prevent unnecessary energy and data flow from occurring.

The public key may be transmitted to the switch through a control plane, the switch may be directly connected to the host, and the host, to which the public key is transmitted, may be configured to transmit a firewall rule of the host to the host monitor through a data plane. Accordingly, the firewall information of the host on the SDN can be gathered and processed safely.

Since the host monitor receives the firewall rule of the host periodically, it is possible to quickly and accurately cope with the change in the SDN environment.

The merged firewall rule is integrated with the flow rule of the switch, or is the same as the flow rule of the switch, thereby using the switch's own function as the firewall function on the SD.

In another embodiment, a method for deploying a firewall on an SDN includes: gathering firewall rules of at least two hosts; merging the firewall rules to provide a merged firewall rule; and transmitting the merged firewall rule to only a selected switch, wherein the switch, to which the merged firewall rule is transmitted, is selected as switches that maximize a total data traffic reduced in the network. According to the present disclosure, it is possible to minimize the useless data flow on the SD and to operate the firewall in an optimal state.

A total number of the merged firewall rules do not exceed the capacity of the switch, thereby ensuring the stable operation of the firewall.

The merged firewall rule for any one host is placed on only one switch, thereby preventing the unnecessary resource waste of the SDN.

The gathering of the firewall rules of the at least two hosts is performed by an encryption process, thereby excluding malicious intruders.

The encryption process may include: distributing a public key by using a control plane of a network; assigning, by the switch receiving the public key, the public key to a host directly connected to the switch; and encrypting the firewall rule of the host by using the public key and transmitting the encrypted firewall rule to a data plane, thereby sufficiently excluding malicious users so as to be suitable for the SDN environment.

The details of one or more embodiments are set forth in the accompanying drawings and the description below. Other features will be apparent from the description and drawings, and from the claims.

DETAILED DESCRIPTION OF THE EMBODIMENTS

Hereinafter, specific embodiments of the present disclosure will be described in detail with reference to the accompanying drawings. However, the spirit of the present disclosure is not limited to the following embodiments. Those skilled in the art who understand the spirit of the present disclosure can easily suggest other embodiments falling within the scope of the same idea by adding, changing, deleting, and supplementing components. These embodiments will also fall within the scope of the present disclosure.

Figure 1:
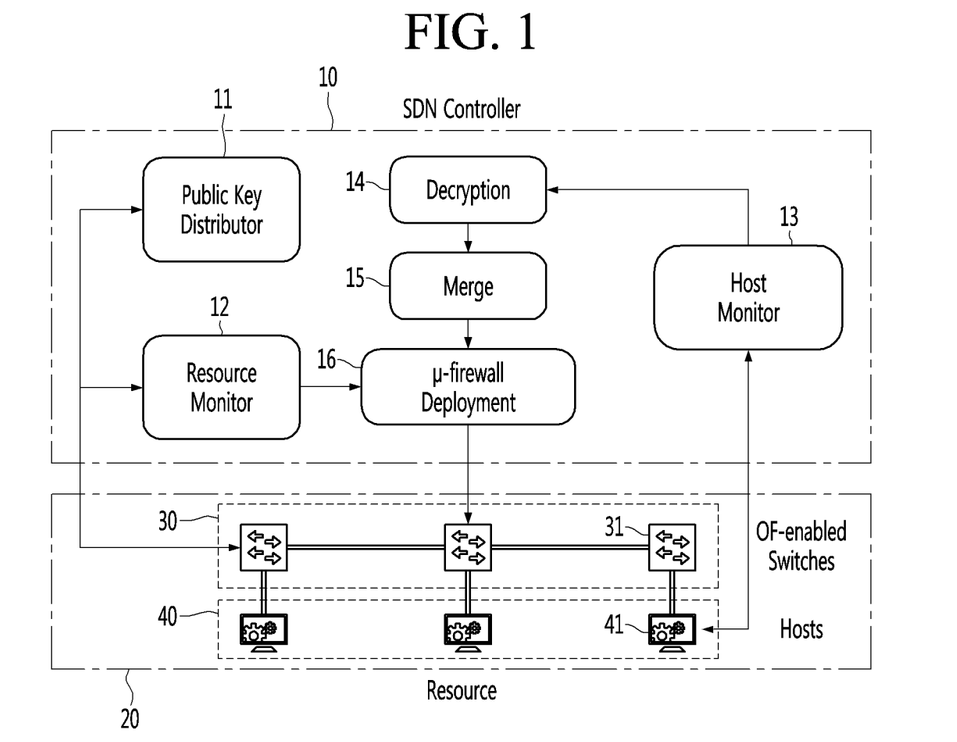
FIG. 1 is a diagram for describing an apparatus for deploying a firewall on an SDN according to an embodiment.

FIG. 1 is a diagram for describing an apparatus for deploying a firewall on an SDN according to an embodiment.

FIG. 1 illustrates a network as an SDN environment including an apparatus 10 for deploying a firewall on an SDN and a resource 20. The apparatus and the method for deploying the firewall on the SDN according to the embodiment are applied to the network. The apparatus for deploying the firewall on the SDN may be applied as part of the overall apparatus for controlling the network of the SDN environment.

The resource 20 includes a switching area 30 including a plurality of switches 31 and a host area 40 including a plurality of hosts 41. The firewall of the resource 20 is managed by the apparatus for deploying the firewall on the SDN. The switch may be an OF-enabled switch to which an OpenFlow protocol is applied.

The apparatus 10 for deploying the firewall on the SDN includes a public key distributor 11 that transmits a public key to the resource 20, a resource monitor 12 that monitors resource information, a host monitor 13 that receives the firewall rules of the hosts 41, which are encrypted using the public key, a decryption unit 14 that decrypts information received from the host monitor 13, a merge unit 15 that merges the decrypted information into the flow rules of the switches so as to match the capacities of the switches 31, and a firewall deployment unit 16 that determines the switch in which the flow rule is to be installed, and deploys the firewall to the determined switch.

The operation of the apparatus for deploying the firewall on the SDN die will be described in detail.

If a malicious user finds out the information of the host, the firewall of the host may be broken. Therefore, the public key distributor transmits a public key distribution message to each switch 31 through a control plane so as to gather firewall information of each host 41.

In this case, the respective switches 31 may be directly connected to the respective hosts 41 through a data plane. The switches 31 may safely receive commands through the control plane and safely and immediately transmit the public key to the hosts 41 to which the switches 31 are directly connected through the data plane.

Each of the hosts 41, which has received the public key, encrypts its own firewall rule by using the public key and transmits the encrypted public key to the host monitor 13. In this case, the encrypted information may be transmitted through the data plane. The host monitor 13 may instruct each of the hosts 41 to transmit the encrypted firewall rule at regular intervals. By being performed periodically, it can quickly and sensitively cope with a change in the state of the host.

The encrypted firewall rule may be decrypted by a private key in the decryption unit 14.

Meanwhile, since the capacity of the switch 31 is limited, it is important to reduce the number of firewall rules. To this end, the merge unit 15 produces a merged firewall rule by reducing the total number of firewall rules without damaging the meaning of the firewall rules. To this end, TCAM Razor Bit Weaving technology may be applied. This technology is a technology to which [A. X. Liu, C. R. Meiners, and E. Torng, "Tcam razor: A systematic approach towards minimizing packet classifiers in tcams," IEEE/ACM TON, vol. 18, no. 2, pp. 490-500, 2010.] and [C. R. Meiners, A. X. Liu, and E. Torng, "Bit weaving: A nonprefix approach to compressing packet classifiers in tcams, "IEEE/ACM TON, vol. 20, no. 2, pp. 488-500, 2012.] are applied, and the contents of the present technology are incorporated in the description of the present disclosure within the necessary range.

The merged firewall rule may be distributed to the switches 31 by the firewall deployment unit 16. At this time, since the excessively distributed firewalls unnecessarily increase the total data capacity of the network, the firewall deployment unit 16 selects the switch on which the merged firewall rule is to be deployed. In order to obtain information necessary for the selection of the switch, the resource monitor 12 may receive the resource usage of the switch and the entire data traffic information of the network in advance. The information of the resource monitor 12 may also be transmitted to the public key distributor 11 so as to be referred to the distribution of the public key.

On which switch 31 the merged firewall rule is developed will be described in detail later.

Since the merged firewall rule corresponds to the flow rule used in the switch of the SDN, the operation of the firewall on the SDN becomes more stable. When the flow rule and the firewall rule of the switch are integrated or the same, the efficiency of the system can be further improved.

Figure 2:
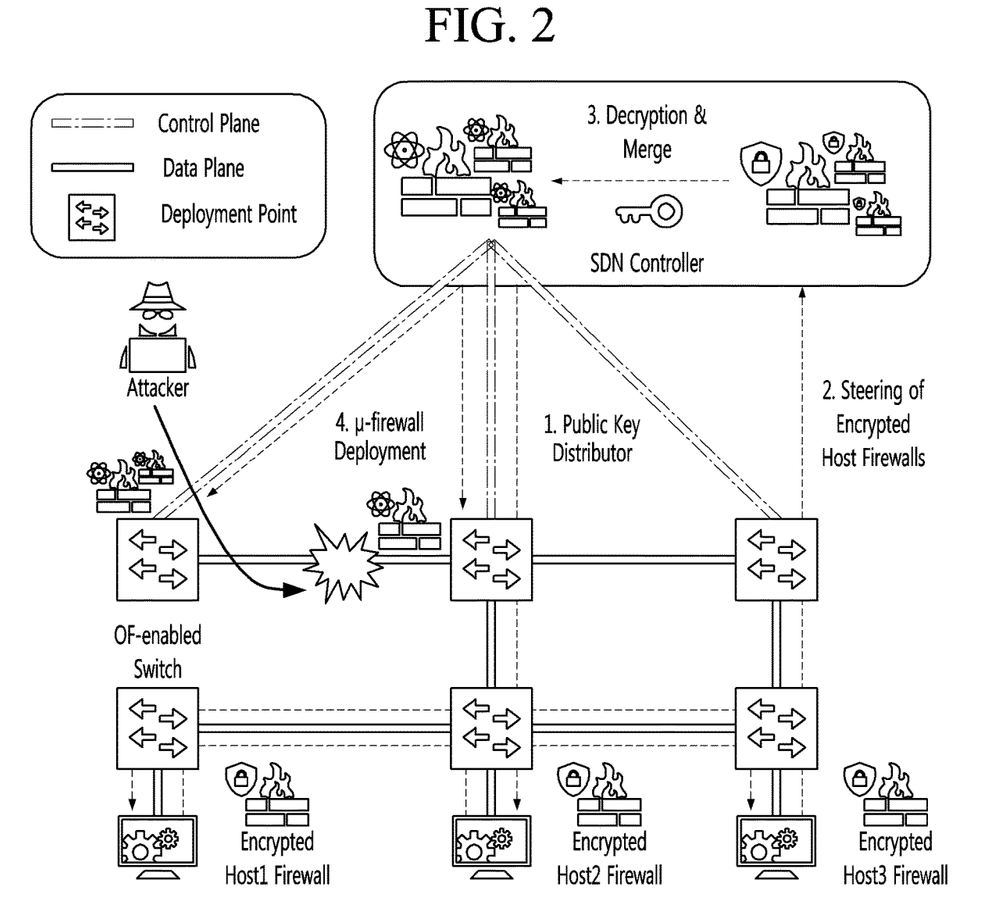
FIG. 2 is a diagram for describing a method for deploying a firewall on an SDN according to an embodiment.

FIG. 2 is a diagram for describing a method for deploying a firewall on an SDN. Numbers in the drawing indicate the sequence of the method for deploying the firewall.

First, the apparatus for deploying the firewall on the SDN (corresponding to part of the SDN controller) distributes the public key by using the control plane of the network. Since the control plane is difficult for a malicious user to access, the stability can be increased. The switch 31, which has received the public key, assigns the public key to the host 41 that is directly connected to the switch 31.

Thereafter, the firewall rule of the host, which is encrypted in each of the hosts 41, is transmitted to the apparatus for deploying the firewall on the SDN through the data plane.

The apparatus for deploying the firewall on the SDN may decrypt the encrypted information by using the private key, merge the firewall rules, and transmit the merged firewall rule to the selected switch. At the time of the merging, the firewall rule is processed according to the switch, and the best switch is selected to deploy the merged firewall rule.

Figure 3:
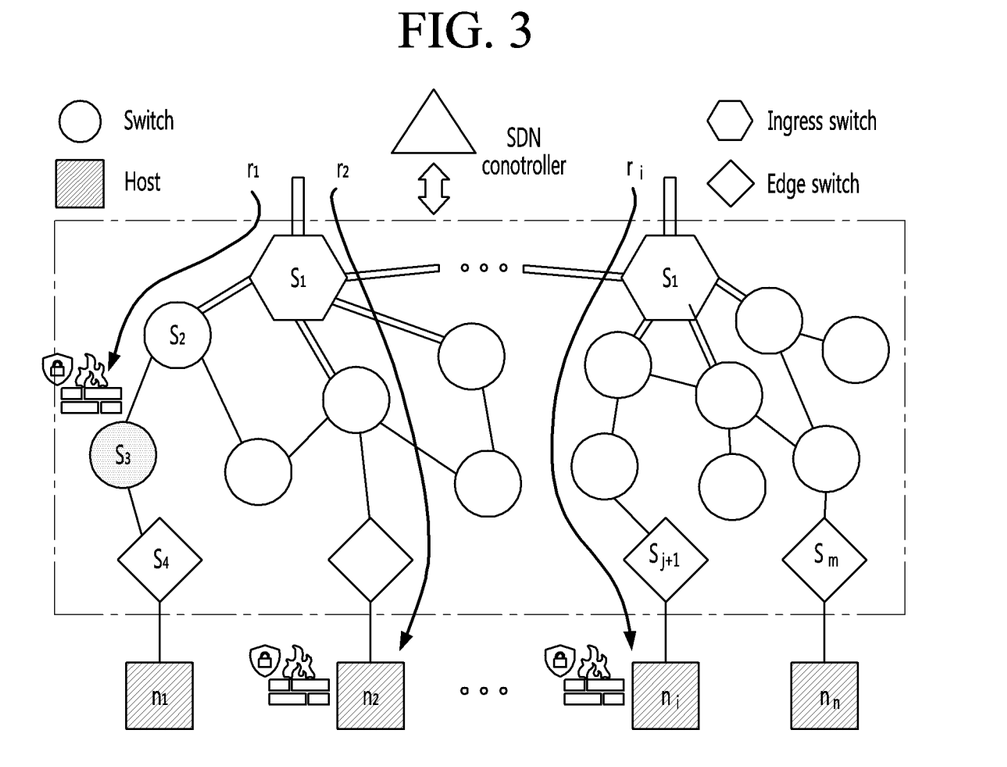
FIG. 3 is a reference diagram for describing selection of a switch to which a merged firewall rule is to be deployed.

FIG. 3 is a reference diagram for describing the selection of the switch to which the merged firewall rule is to be deployed. The process of deploying the merged firewall rule will be described below with reference to FIG. 3.

First, n is the host, m is the flow, and 1 is the switch. i is the host, j is the flow, and k is the serial number of the switch.

The set of hosts is N, the set of flows flowing to the i-th host is $R_i$, and $r_j$, which is an element of $R_i$, is the data rate of j-th flow to $n_i$ among the flows flowing to the i-th host.

P is path information of the host that can be previously determined, H is the number of hops, and x is an index indicating whether the merged firewall rule is deployed to the host. x may be provided as 0 or 1.

For example, in the drawing, the total data traffic will be given as $4r_1+3r_2+4r_3$ where three pieces of path information are merged.

In determining the switch to which the merged firewall rule is to be deployed, the capacity of the firewall rule of each switch is limited, and the firewall rule of any one host is based on being installed on any one switch. In addition, as the deployment of the merged firewall rule is used, a method of maximizing the total data traffic reduced in the network may be performed.

Hereinafter, this will be described in more detail. First, the amount of reduction in data traffic in any host depending on x may be defined by Equation 1.

$$\sum_{j \in R_i} \sum_{k \in P_{j,i}} x_{i,k} \cdot (h_{k,i} \cdot r_j)$$ [Equation 1]

Equation 1 is described. First, x is 1 if the merged firewall rule is deployed to the k-th switch for the i-th host. In this case, the number of hops from the k-th switch to the i-th host is multiplied by the flow data rate r of the i-th host, and this will be the amount of reduction in data traffic for a certain host.

A result value of Equation 1 may be summed for all hosts on the network, and this may be represented by Equation 2.

$$g(X) = \sum_{i \in N} \sum_{j \in R_i} \sum_{k \in P_{j,i}} x_{i,k} \cdot (h_{k,i} \cdot r_j)$$ [Equation 2]

Referring to Equation 2, $h_{k,i} * r_j$ is the reduced data traffic expected when the merged firewall rule for the i-th host is placed on the k-th switch and the flow to the i-th host drops at the k-th switch. The above operation can be performed for all hosts.

The inventors maximized g(X) to maximize the reduced data traffic. As the restrictions to solve this problem, two conditions have been considered.

The first restriction is that the total number of the merged firewall rules does not exceed the capacity of the switch. The second restriction is that the merged firewall rule for any one host is placed on only one switch.

There are various methods for maximizing g(X) in such restrictions. However, the inventors applied a greedy algorithm. This method is represented by Equation 3.

EQUATION 3

Algorithm 1 Proposed greedy firewall deployment scheme

Require: N, $R_i$, $P_{j,i}$, $w_i$, $c_k$
1: //Initialization
2: $X^* = \phi$;
3: Build H by utilizing $P_{j,i}$
4: // Main loop
5: for 0 = 1 to n × m × l do
6:    Select i, j, and k with the largest $h_{k,i} \cdot r_j$.
7:    $x_{i,k} = 1$;
8:    if $\Sigma_{i \in N} x_{i,k} \cdot w_i \leq c_k$ then
9:      if $\Sigma_{k \in pj,i} x_{i,k} = 1$ then
10:        $X^* = X^* \cup x_{i,k}$;
11:        $h_{k,i} \cdot r_j = 0$;
12:        $c_k = c_k - w_i$;
13:        Go back to line 6.
14:      end if
15:    end if
16:    $x_{i,k} = 0$;
17:    $h_{k,i} \cdot r_j = 0$;
18: end for In the algorithm of Equation 3, c is the maximum number of firewall rules that can be placed on the switch, and ω represents the number of firewall rules required for a certain host.

Experiments were performed with 1600 hosts, 800 switches, 2000 hosts, and 1000 switches by the above-described embodiments. The results are shown in FIGS. 4 and 5.

Figure 4:
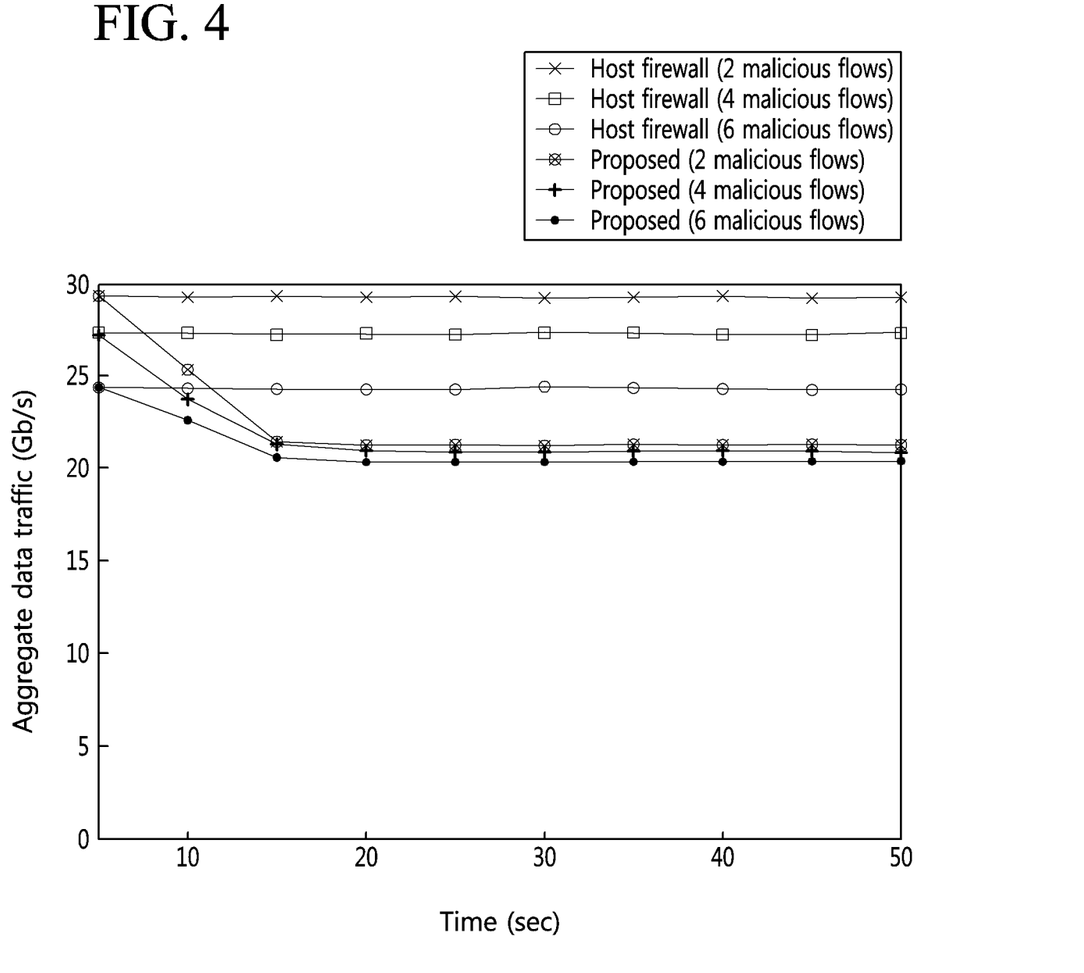
FIG. 4 is a graph of mean total data traffic according to the capacity of the switch.
Figure 5:
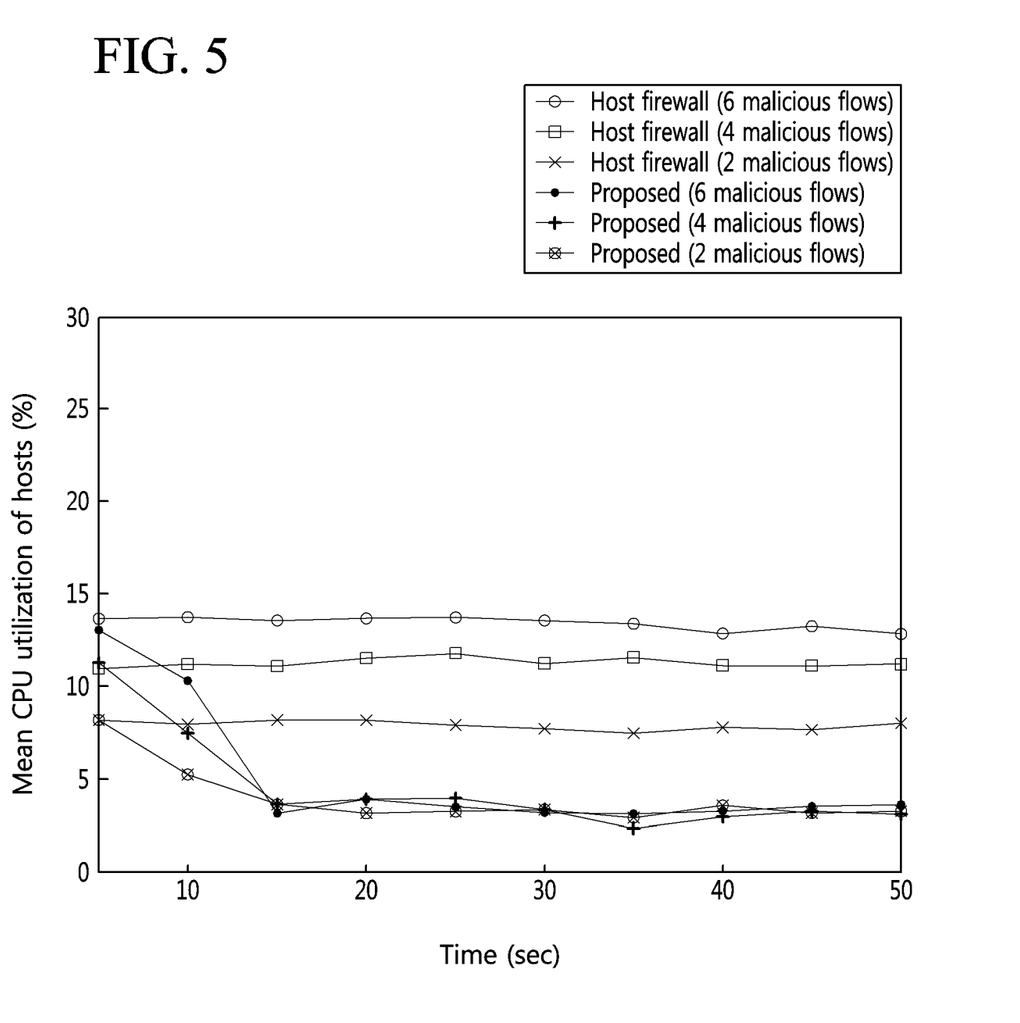
FIG. 5 is a graph of mean resource utilization of the switch according to the number of firewall rules.

FIG. 4 is a graph of mean total data traffic according to the capacity of the switch, and FIG. 5 is a graph of mean resource utilization of the switch according to the number of firewall rules.

Referring to FIG. 4, it can be seen that the data traffic is reduced in the case of the embodiment. Referring to FIG. 5, it can be seen that since the packet does not turn uselessly for the network, the resource of the switch can be sufficiently used.

Meanwhile, in the cloud environment, the cost is determined according to the usage of computing resources such as CPU and network resources. In the embodiment, the amount of traffic flowing through the network and the CPU utilization of the hosts are reduced, thereby reducing cloud environment maintenance costs.

Figure 6:
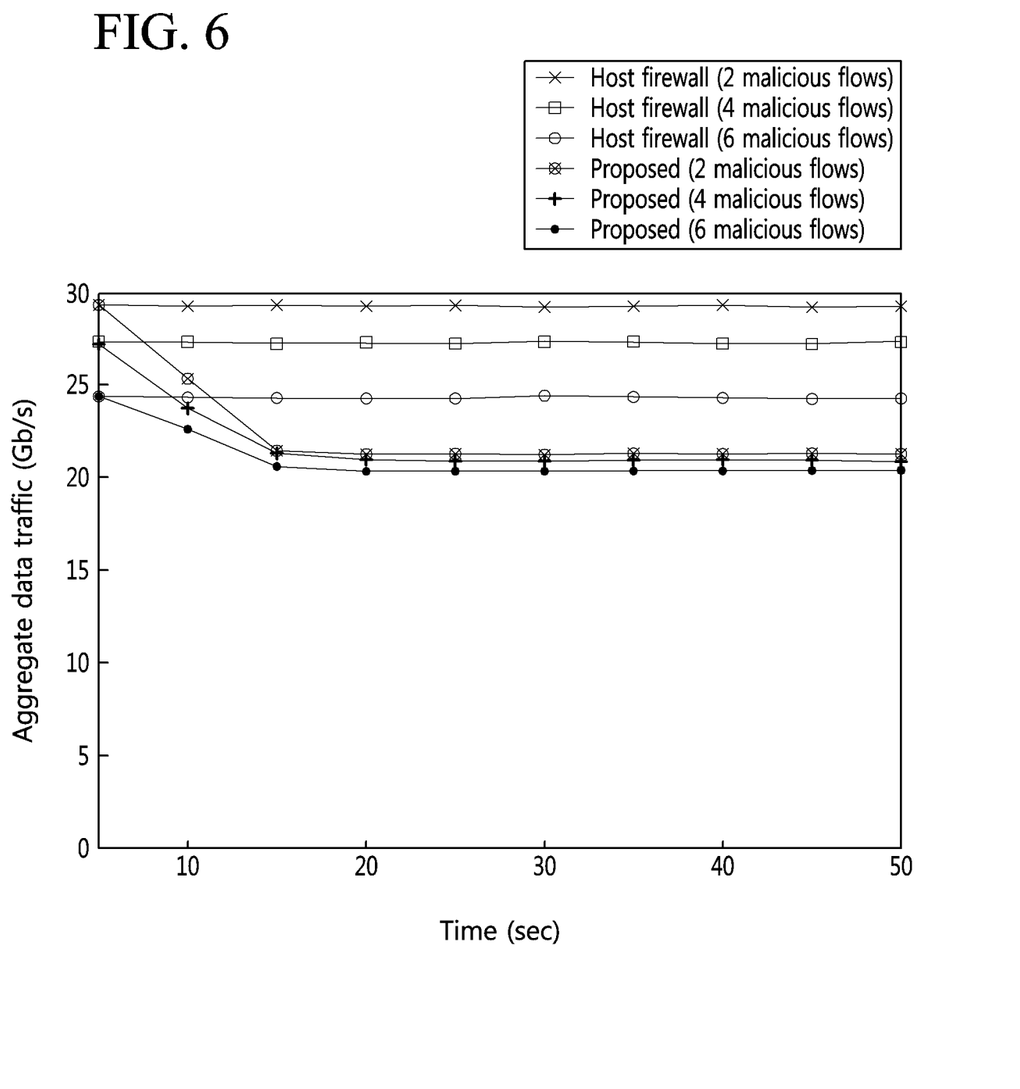
FIG. 6 is a graph of mean data traffic before and after application of the embodiment.
Figure 7:
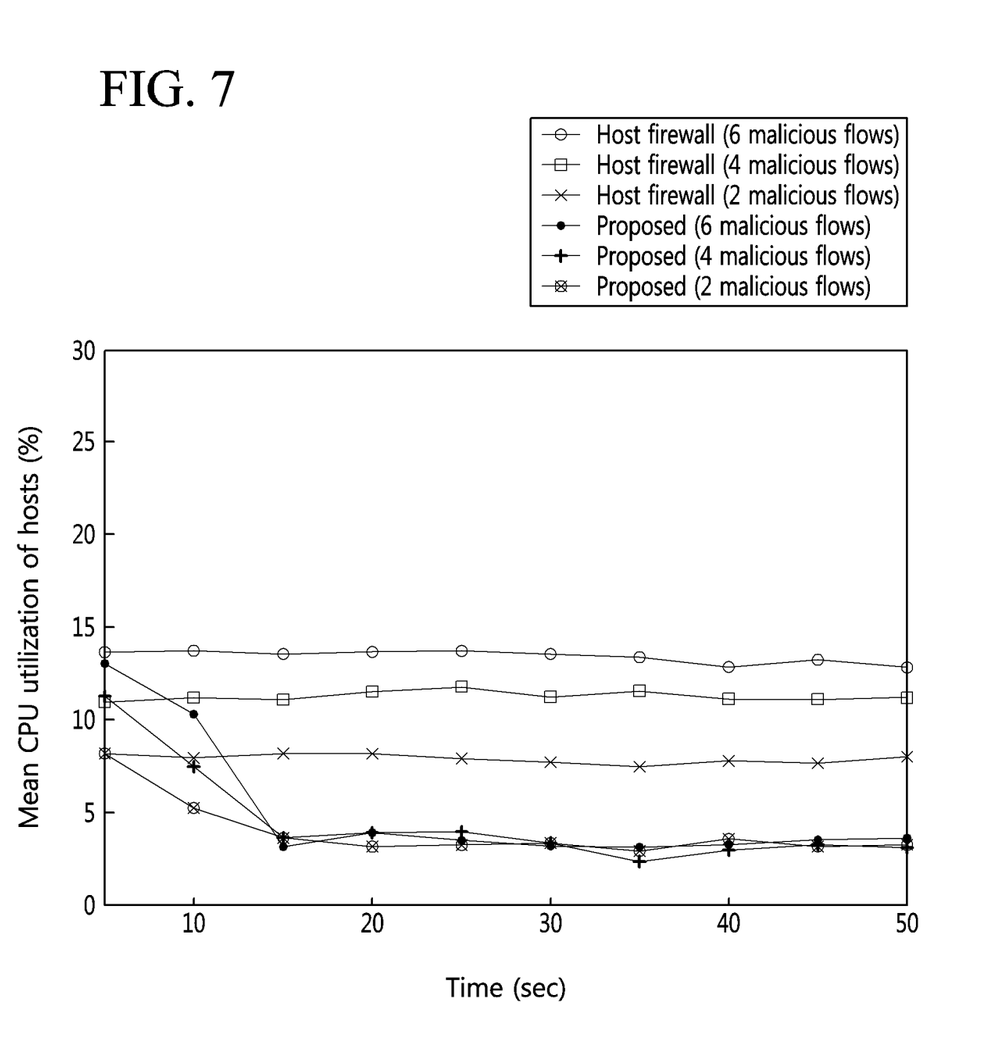
FIG. 7 is a graph of mean CPU resource utilization of a host before and after application of the embodiment.

FIGS. 6 and 7 are diagrams for describing an arbitrary cloud environment before and after the application of the embodiment. FIG. 6 is a graph of mean data traffic in the application of the existing host firewall and the application of the embodiment, and FIG. 7 is a graph of mean CPU resource utilization of the host in the application of the existing host firewall and the application of the embodiment.

Referring to FIGS. 6 and 7, it can be seen that a significant level of reduction in traffic and utilization of computing resources occur as compared to the method using the existing host firewall.

According to the present disclosure, it is possible to safely utilize information of firewalls implemented by hardware, software, virtual machines, containers, and the like, without additional hardware equipment.

According to the present disclosure, it is possible to efficiently use the system by arranging the firewall rule merged in the selected switch as the flow rule of SDN.

According to the present disclosure, even when the firewall is added to the network in the future, the system can be used without any modification, thereby providing excellent scalability.

According to the present disclosure, since the traffic from the external network can be filtered in the middle, the overall network traffic is reduced.

According to the present disclosure, it is possible to reduce the CPU utilization caused by processing the firewall rule in the host or the network firewall equipment.

According to the present disclosure, it is possible to reduce the maintenance cost of the cloud environment.

The present disclosure is expected to reduce the resource usage of the data center by merging the firewall information distributed in each virtual machine in the switches of the network. The present disclosure can be applied to, for example, the NSX data center of Nicira Networks Inc.

The present disclosure can be applied to a newly configured network (SDN), a corporate data center network, or a corporate network or a university network providing cloud services.

According to the present disclosure, the application of the firewall deployment is easy because the firewall can be deployed by installing an SDN-compatible router in the main road in the existing network, and the network stability can be secured by inspecting traffic regardless of the location of the firewall.

According to the present disclosure, even when the network changes, it is possible to cope with the change, thereby greatly expecting the usage thereof.

What is claimed is:

1. An apparatus for deploying a firewall on a software-defined network (SDN), the apparatus comprising:
    a public key distributor configured to transmit a public key;
    a resource monitor configured to monitor resources of a network;
    a host monitor configured to receive a firewall rule of at least one host, which is encrypted by the public key;
    a decryption unit configured to decrypt information received from the host monitor by using a secret key;
    a merge unit configured to merge the decrypted information to provide a merged firewall rule; and
    a firewall deployment unit configured to deploy the merged firewall rule to a switch;
    wherein the public key is transmitted to the switch through a control plane, and the switch is directly connected to the host, and
    the host, to which the public key is transmitted, is configured to transmit a firewall rule of the host to the host monitor through a data plane.

2. The apparatus according to claim 1, wherein the switch, to which the public key is transmitted, is configured to transmit the public key to the host through the data plane, and the host, to which the public key is transmitted, is configured to encrypt the firewall rule of the host by using the public key and transmit the encrypted firewall rule to the host monitor.

3. The apparatus according to claim 1, wherein the host monitor is configured to periodically receive the firewall rule of the host.

4. The apparatus according to claim 1, wherein the merged firewall rule is integrated with a flow rule of the switch, or is the same as the flow rule of the switch.

5. An apparatus for deploying a firewall on a software-defined network (SDN), the apparatus comprising:
    a public key distributor configured to transmit a public key;
    a resource monitor configured to monitor resources of a network;
    a host monitor configured to receive a firewall rule of at least one host, which is encrypted by the public key;
    a decryption unit configured to decrypt information received from the host monitor by using a secret key;
    a merge unit configured to merge the decrypted information to provide a merged firewall rule; and
    a firewall deployment unit configured to deploy the merged firewall rule to a switch,
    wherein the firewall deployment unit is configured to select the switch to which the merged firewall rule is transmitted, and
    the switch, to which the merged firewall rule is transmitted, is selected as the switches that maximize a total data traffic reduced in the network.

6. The apparatus according to claim 5, wherein a total number of the merged firewall rule does not exceed the capacity of the switch.

7. The apparatus according to claim 5, wherein the merged firewall rule for any one host is placed on only one switch.

8. A method for deploying a firewall on a software-defined network (SDN), the method comprising:
    gathering firewall rules of at least two hosts;
    merging the firewall rules to provide a merged firewall rule; and
    transmitting the merged firewall rule to only a selected switch,
    wherein the switch, to which the merged firewall rule is transmitted, is selected as switches that maximize a total data traffic reduced in the network,
    wherein the gathering of the firewall rules of the at least two hosts is performed by an encryption process, the encryption process comprising:
    distributing a public key by using a control plane of a network;
    assigning, by the switch receiving the public key, the public key to a host directly connected to the switch; and
    encrypting the firewall rule of the host by using the public key and transmitting the encrypted firewall rule to a data plane.

9. The method according to claim 8, wherein a total number of the merged firewall rules does not exceed the capacity of the switch.

10. The method according to claim 8, wherein the merged firewall rule for any one host is placed on only one switch.

* * * * *